US009781723B2

United States Patent
Agardh et al.

(10) Patent No.: US 9,781,723 B2
(45) Date of Patent: Oct. 3, 2017

(54) METHOD FOR OPERATING A BASE STATION IN A WIRELESS RADIO NETWORK, BASE STATION AND USER EQUIPMENT

(71) Applicant: Sony Corporation, Tokyo (JP)

(72) Inventors: Kare Agardh, Rydeback (SE); Vanja Plicanic Samuelsson, Lund (SE); Rickard Ljung, Helsingborg (SE); Erik Bengtsson, Eslöv (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/648,583

(22) PCT Filed: Mar. 28, 2014

(86) PCT No.: PCT/IB2014/060248
§ 371 (c)(1),
(2) Date: May 29, 2015

(87) PCT Pub. No.: WO2015/145214
PCT Pub. Date: Oct. 1, 2015

(65) Prior Publication Data
US 2017/0013602 A1    Jan. 12, 2017

(51) Int. Cl.
*H04M 3/00* (2006.01)
*H04W 72/04* (2009.01)
(Continued)

(52) U.S. Cl.
CPC ........ *H04W 72/046* (2013.01); *H04B 7/0686* (2013.01); *H04L 5/0044* (2013.01);
(Continued)

(58) Field of Classification Search
CPC ..... H04W 16/28; H04W 36/30; H04W 76/02; H04W 72/04; H04W 72/1226; H04W 72/1231; H04W 72/1289; H04W 76/025
(Continued)

(56) References Cited

U.S. PATENT DOCUMENTS

2004/0162075 A1    8/2004  Malladi et al.
2006/0281494 A1*  12/2006  Wilson .................. H01Q 1/246
                                                        455/562.1

(Continued)

OTHER PUBLICATIONS

"3rd Generation Partnership Project: Technical Specification Group Radio Access Network; Evolved Universal Terrestrial Radio Access (E-UTRA); Physical Channels and Modulation"; 3GPP Standard; 3GPP TS 36.211, 3rd Generation Partnership Project (3GPP); Jun. 17, 2013 ; pp. 1-108.

(Continued)

*Primary Examiner* — Olumide T Ajibade Akonai
*Assistant Examiner* — Jaime Holliday
(74) *Attorney, Agent, or Firm* — Wolf, Greenfield & Sacks, P.C.

(57) ABSTRACT

A base station (11) for a wireless radio network (10) comprises a plurality of antennas (12) for transmitting radio frequency signals between the base station (11) and a user equipment (16). The base station (11) receives at each antenna (12) of a subset of the plurality of antennas (12) a training signal sent by the user equipment (16) in a first frame (20) and determines an antenna configuration parameter for each antenna (12) of the subset of the plurality of antennas (12) based on the training signal received in the first frame (20) for a subsequent transmission of payload information (33, 34) between the base station (11) and the user equipment (16) in a second frame (30) which is different from the first frame (20).

16 Claims, 2 Drawing Sheets

(51) Int. Cl.
  *H04B 7/06*    (2006.01)
  *H04W 76/02*   (2009.01)
  *H04W 16/28*   (2009.01)
  *H04W 36/30*   (2009.01)
  *H04W 72/12*   (2009.01)
  *H04L 5/00*    (2006.01)
  *H04B 7/0413*  (2017.01)
  *H04W 88/10*   (2009.01)

(52) U.S. Cl.
  CPC ... *H04W 72/0413* (2013.01); *H04W 72/0446* (2013.01); *H04B 7/0413* (2013.01); *H04L 5/0048* (2013.01); *H04W 16/28* (2013.01); *H04W 36/30* (2013.01); *H04W 72/04* (2013.01); *H04W 72/1226* (2013.01); *H04W 72/1231* (2013.01); *H04W 72/1289* (2013.01); *H04W 76/02* (2013.01); *H04W 76/025* (2013.01); *H04W 88/10* (2013.01)

(58) Field of Classification Search
  USPC ............... 455/422.1, 418, 450, 452.1, 452.2
  See application file for complete search history.

(56) References Cited

U.S. PATENT DOCUMENTS

| | | | |
|---|---|---|---|
| 2008/0081671 A1* | 4/2008 | Wang | H04L 25/0204 455/562.1 |
| 2009/0067377 A1* | 3/2009 | Talukdar | H04L 5/0048 370/329 |
| 2009/0180410 A1 | 7/2009 | Lee et al. | |
| 2011/0053630 A1* | 3/2011 | Higuchi | H04L 5/0048 455/509 |
| 2013/0315262 A1* | 11/2013 | Baik | H04L 27/2602 370/474 |

OTHER PUBLICATIONS

International Search Report of PCT/IB2014/060248 dated Jun. 16, 2014, and Written Opinion dated Jun. 25, 2014.

* cited by examiner

[Fig. 1]
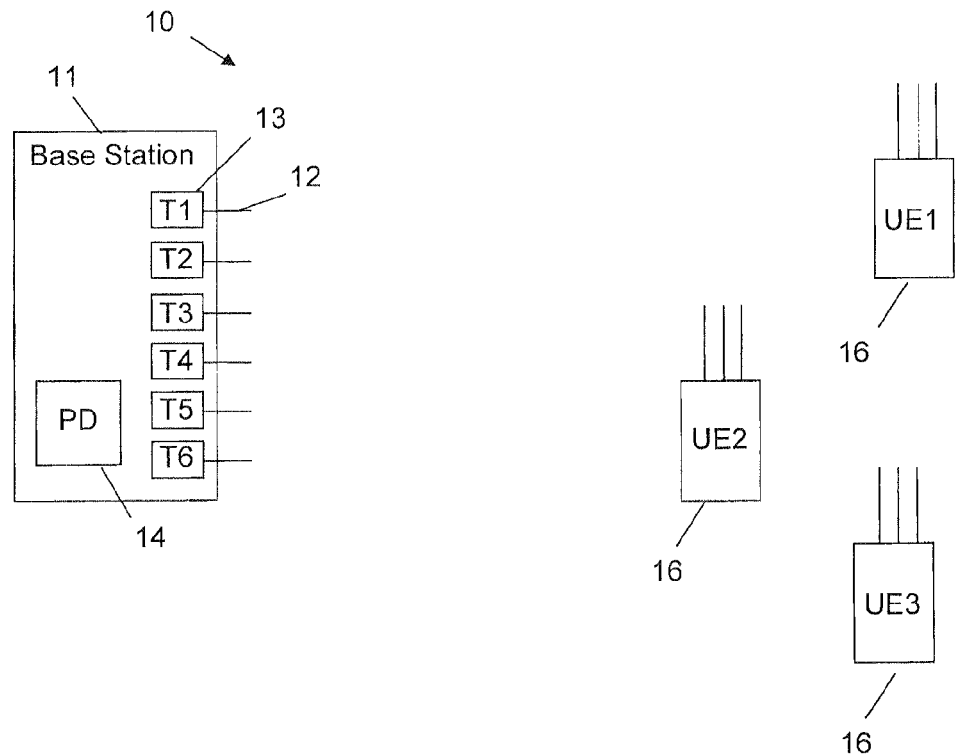
[Fig. 2]
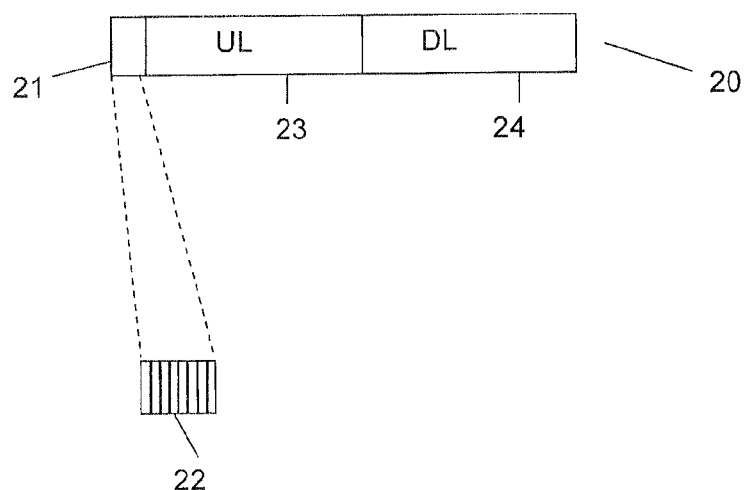

[Fig. 3A]
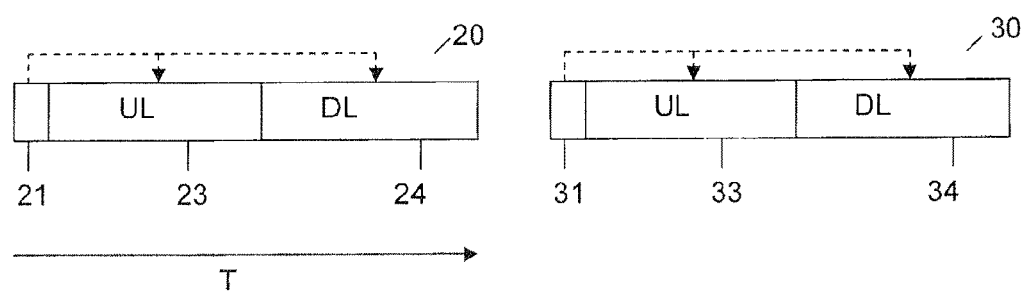
[Fig. 3B]
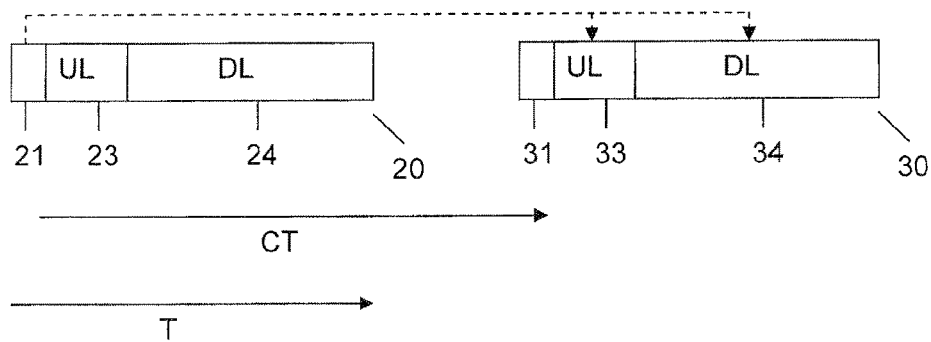

METHOD FOR OPERATING A BASE STATION IN A WIRELESS RADIO NETWORK, BASE STATION AND USER EQUIPMENT

CROSS-REFERENCE TO RELATED APPLICATION

This application is the National Phase under 35 U.S.C. §371 of PCT International Application No. PCT/IB2014/060248, filed Mar. 28, 2014, the entire contents of the aforementioned application is hereby incorporated herein by reference.

TECHNICAL FIELD

The present invention relates to a method for operating a base station in a wireless radio network. Especially, the present invention relates to a method for operating a base station comprising a plurality of antennas for transmitting radio frequency signals according to a so-called multiple-input and multiple-output (MIMO) technology. The present invention relates furthermore to a base station which implements the method, and a user equipment which is configured to be used in connection with the base station.

BACKGROUND ART

For increasing data transmission performance and reliability, the so-called multiple input and multiple-output technology (MIMO) may be used in wireless radio frequency telecommunications for transmitting information between a base station and a user equipment. The MIMO technology relates to the use of multiple send and receive antennas for a wireless communication at for example a base station or a user equipment. The MIMO technology forms the basis for coding methods which do not only use the temporal dimension but also the spatial dimension for transmitting information and, therefore, enables a space and time coding. Thus, the quality and data rate of the wireless communication may be increased.

When a large number of user equipments is arranged within a cell served by a base station having a plurality of antennas and transmitting information according to the above-described MIMO technology, such an arrangement is called a massive MIMO system. Typically, massive MIMO systems are expected in buildings such as offices, shopping malls and so on. In such an environment, a large number of user equipments can be expected. In massive MIMO systems, the configuration of the individual antenna transceivers of the base station may vary depending on the location of each of the user equipments and transmission conditions in the environment of the base station and the user equipment.

A massive MIMO system may be used in connection with a time division duplex (TDD) system in which a transmission of an information stream between the base station and a user equipment is split up into time slots or sections embedded in a frame structure. Different time slots for uplink (UL) data communications and downlink (DL) data communications may be provided for communicating information from the user equipment to the base station (uplink) and for communicating information from the base station to the user equipment (downlink). In such a massive MIMO system, there is a need for an additional time slot which may be called a "header" for transmitting a pilot signal or a training signal including a training sequence from the user equipment to the base station. Based on the received pilot signal, the base station may configure the transceivers of its antenna array according to spatial and environmental conditions for the subsequent transmission of payload information. This is usually done during the uplink slot during which the base station records the received signals and calculates the hermetian transpose of a footprint matrix determined from the training sequence. Thus, high antenna gain for the payload to be transmitted in the following time slots can be achieved. In general, payload may be transmitted in a number of uplink and downlink time slots.

A problem with such a frame structure is that the ratio between the uplink time slot and the downlink time slot can only be altered by decreasing the downlink time. This is due to the fact that the uplink time slot is needed for the calculation of the hermetian transpose of the footprint matrix.

However, especially in broadcasting scenarios, there may be an increased need for higher downlink capacities.

Therefore, it is the object of the invention to provide an improved method of operating a base station in a wireless radio network, especially in a wireless communication network using the MIMO technology, as well as a corresponding base station and a corresponding user equipment, which allow to increase the downlink capacity.

SUMMARY

According to the present invention, this object is achieved by a method for operating a base station in a wireless radio network as defined in claim 1 and a base station as defined in claim 15. Furthermore, the invention also provides a user equipment that is configured for operation with the base station as defined in claim 17. The dependent claims define preferred or advantageous embodiments of the invention.

According to an embodiment of the invention, a method for operating a base station in a wireless radio network is provided, the base station being assigned with a plurality of antennas for transmitting information in a frame structure between the base station and a user equipment, and the user equipment transmitting training signals to the base station. The method comprising the steps receiving at each antenna of a subset of the plurality of antennas of the base station a training signal sent in a first frame by the user equipment, and determining an antenna configuration parameter for each antenna of the subset of the plurality of antennas based on the training signal received in the first frame at the corresponding antenna for a subsequent transmission of payload information in a second frame, which is different from the first frame, between the base station and the user equipment using the determined antenna configuration parameter for the corresponding antenna.

The term "base station" as used herein may relate to any type of a cellular or non-cellular access node of a wireless radio network, so that the term "base station" for example may refer to a base station of a cellular communication network or to an access point of a wireless local area network (WLAN) for the transmission of information with corresponding user equipments. The bases station may comprise a massive antenna array, or the base station or base station side may have distributed antennas, so that the invention may also be applied to so-called cooperative MIMO systems or distributed antenna systems. The term "transmit" or "transmission" etc. as used in the present description covers both receiving information from the user equipment at the base station and sending information from the base station to the user equipment. Furthermore, the term "antenna configuration parameter" is to be understood to cover both an analog configuration and a digital configuration of the respective antenna. In an embodiment of the invention, all antenna configuration is made in the digital domain, so that the antennas may be passive components that are fed with signals having an amplitude and/or a phase determined from the training signals and the correspondingly calculated footprint matrix.

Thus, the base station uses the training signal from the first frame to determine the antenna configuration parameter for the transmission of payload (uplink and/or downlink payload) in the second frame which is different from the first frame and, preferably, is that frame which follows directly the first frame. This approach may be called "slot interleaving" or "header interleaving".

By utilizing the training signal from a prior frame for the calculation of the antenna configuration parameters for a later frame, an asymmetric allocation of the uplink and downlink time slots can be enabled (i.e., the downlink time slot would preferably be longer than the uplink time slot), thereby maintaining a high mobility performance even in massive MIMO systems.

The frame structure or frame setup may be switched at the base station from a "normal" first operating mode, in which a received training signal is used for the same frame, to a second operating mode, in which a received training signal is used for a later frame, upon request by the user equipment, which may happen even dynamically during an established connection, or by configuration. For example, if a user equipment requests more downlink capacity, i.e., a downlink capacity that exceeds a corresponding threshold value, or requests only a relatively low uplink capacity, i.e., an uplink capacity below a corresponding threshold value, or if the uplink has a lower priority, the base station may switch from the "normal" first operating mode to the second operating mode. The ratio between uplink capacity and downlink capacity and the corresponding slot lengths in each frame may be decided by a scheduler in the base station based on the current traffic situation, which would correspond to an indirect request by the user equipment(s).

If the base station switches to the second operating mode during an established connection, this would have to be signalled to the user equipment. Furthermore, the fact that the operating mode was switched would also have to be signalled to all other user equipments that may be communicating with the base station, especially to other user equipments that are using the same subset of antennas, so as to correspondingly synchronize all user equipments concerned.

The second operating mode allows to reduce the time duration of the uplink slot of the corresponding frame compared to the first operating mode, and the uplink slot may even be reduced by up to 100%, so that the corresponding system can then be operated with up to 100% downlink capacity. Nevertheless, there would still be a sufficient time for the calculation of the hermetian transpose of the footprint matrix.

In the second operating mode, the frame length, i.e., the total duration of a frame, would preferably be constant, but would be shorter than in the "normal" first operating mode. If the user equipment were moving in the environment of the base station, there could be an erosion of the validity of a received training sequence, which however is not the case if the frame is changed as indicated above.

The invention also provides a base station and a user equipment which is configured for carrying out the method described above, so that both the base station and the user equipment also include the above advantages and are preferably suitable for the use in MIMO systems, especially in massive MIMO systems Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF DRAWINGS

The present invention will be described in more detail with reference to the accompanying drawings.

FIG. 1 shows schematically a base station and user equipments according to an embodiment of the invention.

FIG. 2 shows a possible structure of a frame transmitted in the system of FIG. 1.

FIG. 3A illustrates the use of a received training signal in a first operating mode of the system shown in FIG. 1.

FIG. 3B illustrates the use of a received training signal in a second operating mode of the system shown in FIG. 1 according to an embodiment of the invention.

DESCRIPTION OF EMBODIMENTS

In the following, exemplary embodiments of the present invention will be described in more detail. It is to be understood that the features of the various exemplary embodiments described herein may be combined with each other unless specifically noted otherwise. Same reference signs in various drawings refer to similar of identical components. Any coupling between components or devices shown in the figures may be a direct or an indirect coupling unless specifically noted otherwise.

FIG. 1 shows three user equipments 16 (UE1, UE2 and UE3) arranged in an environment 10 of a base station 11. The base station 11 comprises a plurality of antennas 12 and associated transceivers 13 (T1 . . . T6). In FIG. 1 only six antennas 12 and six transceivers 13 are shown for clarity reasons. However, these are only exemplary numbers, and the base station 11 may comprise for example an array of 30 to 100 or even more antennas 12 and associated transceivers 13 arranged for example in a matrix or cylindrically. Furthermore, it is also possible that the base station side comprises a plurality of distributed antennas. Likewise, the user equipments 16 may each comprise one or more antennas. For example, each user equipment 16 may comprise one to four antennas (the user equipments of FIG. 1 each have three antennas).

The base station 11 comprises furthermore a processing device (PD) 14 coupled to the transceivers 13 and adapted to configure the transceivers 13 for transmitting radio frequency signals between the base station 11 and the user equipments 16. The multiple antennas 12 and transceivers 13 of the base station 11 may be used and configured such that the above-described multiple-input and multiple-output (MIMO) technology may be utilized for transmissions between the base station 11 and the user equipments 16. The signal processing according to the MIMO technology may be performed in the analog or digital domain or a combination thereof. Therefore, for example, a part of the transceiver functionality may be implemented digitally, for example in a signal processor or in the processing device, and the antennas 12 and the remaining parts of the transceivers 13 may be active or passive analog components.

For determining configuration parameter sets for the transceivers 13 of the base station 11 which provide a high quality transmission taking into account spatial information of the individual user equipments 16 with respect to the base station 11, a radio frequency training signal or a pilot signal with a training sequence may be transmitted from each user equipment 16 to the base station 11 which is received and processed at each antenna of s subset of the plurality of antennas 12. The subset may include for each user equipment 16 one, two or more of the plurality of antennas 12. Based on the received training signal, corresponding configuration parameters for the transceivers 13 may be determined at the base station 11. This will now be described in more detail with reference to FIG. 2.

FIG. 2 shows a structure of a frame 20 that may be transmitted between each of the user equipments 16 and the base station 11. The frame 20 in general comprises a header 21, and a payload information section comprising an uplink UL payload information section 23 and a downlink DL payload information section 24. Each header comprises a plurality of time slots 22 for receiving training signals from the user equipments 16. In the example shown in FIG. 2, the header comprises eight time slots 22 without, of course, being restricted to this particular number of time slots.

The training sequence received in a frame 20 is normally be used at the base station 11 to calculate the hermetian transpose of the footprint matrix to determine the antenna configuration parameters for the antennas 12 concerned for the subsequent transmission of payload information, the updated antenna configuration parameters already being effective for the same frame 20.

This is also shown in FIG. 3A.

FIG. 3A shows two frames 20, 30 which are transmitted one after the other and each have the frame structure described above with a header 21, 31 and a payload information section comprising an uplink payload information section/slot 23, 33 and a downlink payload information section/slot 24, 34. The training sequence received in the header 21, 31 is used at the base station 11 to determine the antenna configuration parameters for the subsequent transmission of the payload information in the same frame 20 or 30, i.e. for the uplink payload information section 23, 33 and/or the downlink payload information section 24, 34. The frame length T of the individual frames 20, 30 is constant.

If the uplink has less priority, or if an increased downlink capacity is requested by a user equipment, the base station 11 may change from the "normal" operating mode shown in FIG. 3A to a different operating mode including a different frame setup, which is shown in FIG. 3B.

According to FIG. 3B, the training sequence received in the header 21 of the frame 20 is not used for the same frame, but for the following frame 30, which may in particular be the next frame directly following the frame 20. Thus, the antenna configuration parameters determined on the basis of this training sequence will be applied to the transmission of the payload in the next frame 30, i.e., to the transmission of uplink payload information in the uplink payload information section 33 and/or the transmission of downlink payload information in the downlink payload information section 34 of the frame 30.

As can also be taken from FIG. 3B, the frame length T is shortened compared to FIG. 3A to make sure that the mobility robustness of the system with respect to a movement of the corresponding user equipment 16 in the environment of the base station 11 is constant. Nevertheless, there is a sufficient calculation time CT for the calculation of the antenna configuration parameters of the subsequent frame 30, the calculation time CT also being constant.

The change of the frame setup from the operating mode shown in FIG. 3A to the operating mode shown in FIG. 3B allows to reduce the length of the uplink payload information section, thereby changing the uplink capacity/downlink capacity ratio accordingly. In particular, the uplink payload information section 23, 33 may be reduced by up to 100%, i.e., the length of the uplink payload information section 23, 33 would then be zero, so that the system may broadcast with up to 100% downlink capacity.

Thus, the base station 11 may also change from the operating mode shown in FIG. 3A to the operating mode shown in FIG. 3B by configuration if the operator wants to use the system for broadcasting with an increased downlink capacity.

In general, the configuration parameters determined on the basis of the training signals for the transmission of uplink information may be different from those for the transmission of downlink information. Furthermore, the training signals need to be orthogonal in order for the base station 11 to identify the configuration parameters for the plurality of antennas 12 for each of the individual user equipments 16. In the above described exemplary embodiments, the training signals are separated by using different time slots according to a time division multiple access (TDMA) technology. However, orthogonality may also be achieved by other orthogonal access technologies like code division multiple access (CDMA) or frequency division multiple access (FDMA) technologies or a combination thereof.

The invention claimed is:

1. A method for operating a base station in a wireless radio network,
wherein the base station is assigned with a plurality of antennas for transmitting information in a frame structure between the base station and a user equipment, and
wherein the user equipment transmits training signals to the base station, the method comprising the steps:
receiving at each antenna of a subset of the plurality of antennas of the base station a training signal sent in a first frame by the user equipment, and
determining an antenna configuration parameter for each antenna of the subset of the plurality of antennas based on the training signal received in the first frame at the corresponding antenna, wherein, in a first operating mode, the base station determines the antenna configuration parameter for each antenna of the subset of the plurality of antennas based on the training signal received in the first frame at the corresponding antenna for a subsequent transmission of payload information in the first frame between the base station and the user equipment using the determined antenna configuration parameter for the corresponding antenna, and
wherein, in a second operating mode, the base station determines the antenna configuration parameter for each antenna of the subset of the plurality of antennas based on the training signal received in the first frame at the corresponding antenna for a subsequent transmission of payload information in a second frame, which is different from the first frame, between the base station and the user equipment using the determined antenna configuration parameter for the corresponding antenna.

2. The method according to claim 1,
wherein the second frame, for which the antenna configuration parameter is determined by the base station, is a frame which directly follows the first frame.

3. The method according to claim 1,
wherein the frame structure for the transmission of information between the base station and the user equipment is such that each frame of the frame structure comprises a header section for the transmission of the training signal, an uplink section for the transmission of information from the user equipment to the base station and a downlink section for the transmission of information from the base station to the user equipment.

4. The method according to claim 1,
wherein a time duration of the downlink section of each frame in the second operating mode is larger than a time duration of the downlink section of each frame in the first operating mode.

5. The method according to claim 4,
wherein, in the second operating mode, the time duration of the downlink section is different from a time duration of the uplink section.

6. The method according to claim 5,
wherein, in the second operating mode, the time duration of the downlink section is larger than the time duration of the uplink section.

7. The method according to claim 4,
wherein, in the second operating mode, the time duration of the uplink section is zero.

8. The method according to claim 4,
wherein a total time duration of each frame in the second operating mode is smaller than the total time duration of each frame in the first operating mode.

9. The method according to claim 1,
further comprising switching at the base station from the first operating mode to the second operating mode upon request of the user equipment or as a result of a reconfiguration of the base station.

10. The method of claim 9,
wherein the base station switches from the first operating mode to the second operating mode if the user equipment requests a capacity for the transmission of downlink information from the base station to the user equipment, which exceeds a downlink capacity threshold value, or if the user equipment requests a capacity for the transmission of uplink information from the user equipment to the base station, which is below an uplink capacity threshold value.

11. The method of claim 9,
wherein the base station switches from the first operating mode to the second operating mode during an established connection with the user equipment.

12. The method of claim 11,
wherein the base station signals the switching to the second operating mode to the user equipment and to other user equipments which are also communicating with the base station.

13. The method according to claim 1,
wherein the method is carried out in a wireless MIMO communication system.

14. The method according to claim 1, wherein said determining of the antenna configuration parameter comprises calculating a transpose of a footprint matrix determined from the training signal.

15. A base station for a wireless radio network,
the base station being assigned with a plurality of antennas for transmitting radio frequency signals in a frame structure between the base station and a user equipment, and
the base station comprising:
a processing device configured to
receive at each antenna of a subset of the plurality of antennas of the base station a training signal sent in a first frame by the user equipment, and
determine an antenna configuration parameter for each antenna of the subset of the plurality of antennas based on the training signal received in the first frame at the corresponding antenna, wherein, in a first operating mode, the base station determines the antenna configuration parameter for each antenna of the subset of the plurality of antennas based on the training signal received in the first frame at the corresponding antenna for a subsequent transmission of payload information in the first frame between the base station and the user equipment using the determined antenna configuration parameter for the corresponding antenna, and
wherein, in a second operating mode, the base station determines the antenna configuration parameter for each antenna of the subset of the plurality of antennas based on the training signal received in the first frame at the corresponding antenna for a subsequent transmission of payload information in a second frame, which is different from the first frame, between the base station and the user equipment using the determined antenna configuration parameter for the corresponding antenna.

16. A user equipment for a wireless radio network, wherein the user equipment is configured for transmission of radio frequency signals between the user equipment and the base station of claim 15.

* * * * *